United States Patent [19]

Ogura

[11] Patent Number: 5,120,611

[45] Date of Patent: * Jun. 9, 1992

[54] METAL OXIDE CERAMIC COMPOSITE POWDER AND METHOD OF MANUFACTURING THE SAME

[75] Inventor: Atsushi Ogura, 14-30, Yukinoshita 2-chome, Kamakura-shi, Kanagawa-ken, Japan, 248

[73] Assignee: Atsushi Ogura, Kanagawa, Japan

[ * ] Notice: The portion of the term of this patent subsequent to Aug. 28, 2007 has been disclaimed.

[21] Appl. No.: 565,374

[22] Filed: Aug. 9, 1990

Related U.S. Application Data

[63] Continuation-in-part of Ser. No. 237,646, Aug. 26, 1988, Pat. No. 4,952,463, which is a continuation of Ser. No. 921,679, Oct. 21, 1986, abandoned, which is a continuation of Ser. No. 930,333, Nov. 12, 1986, abandoned.

[51] Int. Cl.⁵ .............................. B22F 5/00; B05D 5/12
[52] U.S. Cl. ..................................... 428/552; 428/900; 427/126.6; 427/128
[58] Field of Search ............................... 428/552, 900; 427/126.6, 128

[56] References Cited

U.S. PATENT DOCUMENTS

| | | | |
|---|---|---|---|
| 3,044,867 | 7/1962 | Edstrom | 75/5 |
| 3,892,908 | 7/1975 | Lovness | 428/329 |
| 3,996,392 | 12/1976 | Berg et al. | 428/900 X |
| 4,065,519 | 12/1977 | Koch | 428/900 X |
| 4,075,391 | 2/1978 | Berg et al. | 428/900 X |
| 4,160,719 | 7/1979 | Pollack | 75/235 X |
| 4,180,482 | 12/1979 | Nishino et al. | 428/450 X |
| 4,447,501 | 5/1984 | Shigeru et al. | 428/570 |
| 4,587,157 | 5/1986 | Brock et al. | 427/131 X |
| 4,624,798 | 11/1986 | Grindrup et al. | 428/403 X |
| 4,952,493 | 8/1990 | Ogura | 428/552 |

Primary Examiner—Peter A. Nelson
Attorney, Agent, or Firm—Darby & Darby

[57] ABSTRACT

A metal oxide ceramic composite powder has crystals of a reacted and precipitated metal oxide distributed on fine particles of a ceramic material. The metal oxide is derived from an aqueous solution of metal chloride which in the presence of a magnetic field, forms a complex ion solution. The complex ion may comprise a proportional blend of metallic and semi-metallic elements to produce specific properties. The complex ion is reacted and precipitated with an alkaline material to deposit a high purity metal oxide on the ceramic material. Each ceramic particle thus has a uniform coating of a high purity metal oxide deposited thereon.

11 Claims, 1 Drawing Sheet

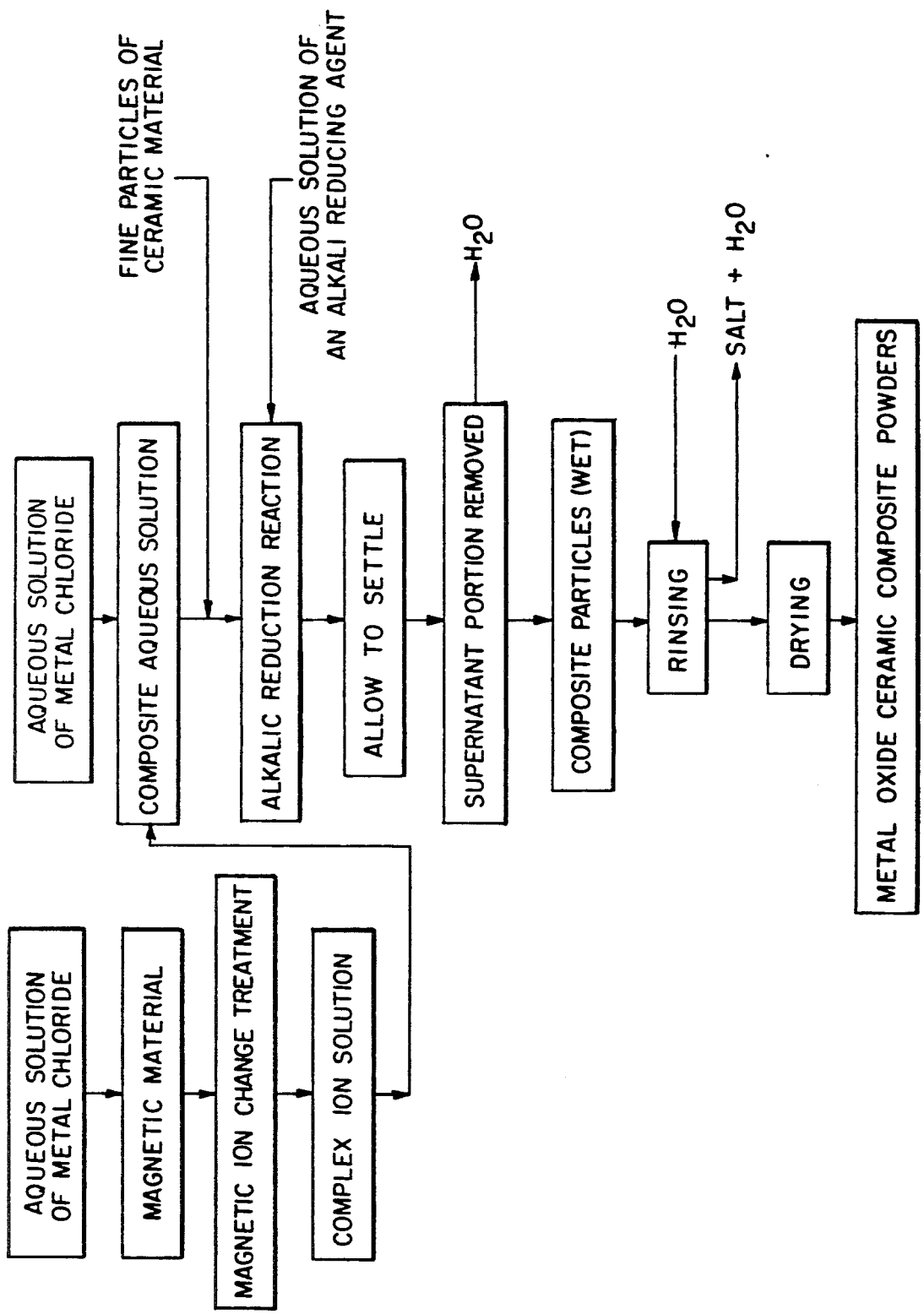

METAL OXIDE CERAMIC COMPOSITE POWDER AND METHOD OF MANUFACTURING THE SAME

CROSS REFERENCE TO RELATED APPLICATIONS

This application is a continuation-in-part U.S. patent application Ser. No. 237,646 filed Aug. 26, 1988, now U.S. Pat. No. 4,952,463, which was a continuation of U.S. patent application Ser. No. 921,679 filed Oct. 21, 1986, now abandoned; and is related to U.S. patent application Ser. No. 259,400 filed Oct. 18, 1988, now pending, which was a continuation of U.S. patent application Ser. No. 930,333, filed Nov. 12, 1986, now abandoned; titled "HOMOGENEOUS SOLID SOLUTION MATERIAL AND METHOD OF MANUFACTURING THE SAME" filed on even date herewith.

TECHNICAL FIELD

This invention relates to a metal oxide ceramic composite powder and a method of manufacturing the same.

BACKGROUND

Ceramics have a melting point higher than that of metals, and sintering or melting a powdery ceramic material to manufacture a ceramic product requires heating at high temperatures. In an effort to solve such a problem, studies have been undertaken to produce a ceramic product by sintering super-fine ceramic particles having a grain size on the order of an angstrom unit. However, a satisfactory method of manufacturing such a ceramic product has not yet been developed. Further, in order to manufacture a multicomponent composite product having a sufficiently homogeneous microstructure, it is necessary to sufficiently homogeneously blend a number of different components, such as metal or semi-metal oxides. However, homogeneous blending of fine particles of such components has been physically difficult. Accordingly, it has been difficult to obtain a composite product in which the fine particles of the components are sufficiently homogeneously and perfectly blended to achieve the desired physical properties and functional requirements.

Ferrites and other metal oxides, which have excellent magnetic and other desirable characteristics, are widely used in various kinds of electromagnetic, semiconductor and other types of devices. However, to produce such devices requires thorough blending of impurity-free components at a predetermined composition ratio. Consequently, production of devices using such high purity ferrites and metal oxides capable of sufficiently exhibiting the desired characteristics has been both difficult and expensive to achieve.

SUMMARY OF THE INVENTION

With a view to solving the prior art problems discussed above, it is an object of the present invention to provide a metal oxide-ceramic composite powder suitable for production of a functional multicomponent composite product having a sufficiently homogeneous microstructure.

Another object is to provide a ferrite-ceramic composite powder which can improve the magnetic characteristics of a metal oxide.

Another object is to provide a method of economically manufacturing the metal oxide-ceramic composite powder described above.

The metal oxide-ceramic composite powder according to the present invention is provided by firmly bonding crystals of a reacted and precipitated metal oxide to the surface of fine particles of a ceramic material according to a process similar to a plating process, thereby completely coating the surface of the fine particles of the ceramic material with the deposited metal oxide. When the metal oxide-ceramic composite powder thus obtained is sintered by application of heat, the heat is efficiently transmitted from the metal oxide coating toward and into the fine particles of the ceramic material coated with the metal oxide, and the metal oxide coating remains to coat the ceramic material until both are completely molten. As a result, the metal oxide component and the ceramic component are blended to form a homogeneous solid solution.

The metal oxide-ceramic composite powder of the present invention has a variety of industrial applications as a material of industrial products. For example, a composite powder using ferrite as the metal oxide according to the present invention can be used as a material for magnetic memories, electronic parts such as insulating elements, semiconductor elements, heat generating elements, thermistors, varistors, dielectric elements, pyroelectric elements, piezoelectric elements, photoelectric elements, photomagnetic elements and the like or for electrical parts, paint pigments, corrosion resistive members, mechanical parts and magnetic fluids.

According to the present invention, such metal oxide ceramic composite powder in which a metal oxide is firmly bonded to and coats the surface of fine particles of a ceramic material is produced by the steps of bringing an aqueous solution of metal chlorides into contact with many pieces or pellets of metals exhibiting magnetic properties in the presence of a magnetic field to turn the metal chloride (Fe-, Ni- Co-, Ba- Al-, Si-, Cu-Ti-, Cr-, Ge-, Mg-, Sn-, Mn-, Mo-, Cd-, etc. chloride solution into an aqueous solution of a complex ion mixing this complex ion solution with an aqueous solution of metal chlorides containing many fine particles of a ceramic material to obtain a composite aqueous solution, mixing an aqueous solution of caustic soda with the composite aqueous solution causing deposition of a metal oxide on the surface of the fine particles of the ceramic material, and rinsing and drying the fine particles of the ceramic material covered with the metal oxide crystal.

According to the method described above, a metal oxide coating having a very high purity can be firmly bonded to the surface of fine particles of a ceramic material in an efficient and relatively simple manner. Therefore, a high purity metal oxide-ceramic composite powder is very simply and economically produced.

Fine ceramic particles preferably used in the present invention includes those of oxides containing a metallic element or a semimetallic element, such as, zirconia ($ZrO_2$), zircon ($ZrSiO_4$), silicon dioxide ($SiO_2$), alumina ($Al_2O_3$), cobalt oxide, titanium oxide, barium oxide and boron oxide. Other semimetallic and/or nonmetallic elements such as Se, Te, As, P, and others may also be used. Fine particles and compounds such as nitride including silicon nitride, or carbides including silicon carbide and mixtures thereof may also be used.

A salt of a metallic element or semimetallic element, such as, nickelic chloride, cobalt chloride, barium chloride, titanium chloride and ferric chloride may be used for the production of the metal oxide-ceramic composite powder. When a mixture of metallic chlorides are used, a film containing an oxide of the metal or semimetal component such as cobalt, barium, titanium or iron can be formed on the surface of the fine particles of the ceramic material in controlled proportions, such that each particle has an essentially identical composition and thickness of the film on the particle. Adjusting the proportion of the metal chlorides in solution determines the film composition.

Other objects and features of the present invention will become apparent from the following description.

BRIEF DESCRIPTION OF THE DRAWINGS

The FIGURE is a schematic representation of the process of the invention.

DESCRIPTION OF THE PREFERRED EMBODIMENT

First, referring to the left side of the process flow chart representation, at least one magnet having a strong magnetic force is placed in a vessel containing an aqueous solution of a metal chloride or metal chloride hydrate having a concentration of about 5 to 35%, so as to establish a magnetic field. With the metal chloride dissolved in water, an electrolytic dissociation occurs through the ionization of the aqueous solution of metal chloride which is an electrolyte.

Many pieces of a magnetic material, for example, iron pellets having a grain size of about 0.1 to 4 mm are immersed in the aqueous solution of metal chloride and the solution is thoroughly agitated. Then, the solution is filtered to obtain an aqueous solution of a complex ion.

In the above steps, the aqueous solution of metal chloride is brought into contact with the magnetized iron pellets in the vessel. Therefore, many cathodes and anodes are formed as a result of the electrolytic ion exchange, and hydrogen ions attracted to the cathodes are discharged as hydrogen gas. Thus, the complex ion solution contains stabilized anions and cations.

The magnetic material may comprise iron, nickel, cobalt, chromium, manganese or any magnetizable metal or alloy which may be sufficiently magnetized to provide an electric potential difference between the magnet and the magnetic material. The material may be supplied as pellets, balls or any other shaped particle of sufficient size to ease removal from the solution after the complex ion is formed.

The metal chlorides and hydrates thereof usable with the present invention may be based on various metals. Those usable, among others, are:

| | | |
|---|---|---|
| $AlCl_3.6H_2O$ | $MgCl_2.4H_2O$ | $TeCl_4$ |
| $BaCl_2.2H_2O$ | $MoCl_5$ | $TlCl$ |
| $BeCl_2$ | $NiCl_2.6H_2O$ | $TiCl_4$ |
| $CrCl_3.6H_2O$ | $PtCl_4.6H_2O$ | $VoCl_2$ |
| $CoCl_2.6H_2O$ | $SiCl_4$ | $YCl_3.6H_2O$ |
| $CuCl_2.2H_2O$ | $AgCl$ | $ZnCl_2$ |
| $CdCl_2.2\frac{1}{2}H_2O$ | $SrCl_2.6H_2O$ | $ZrCl_4$ |
| $GeCl_4$ | $SnCl_2.2H_2O$ | |
| $MnCl_2.4H_2O$ | $TaCl_5$ | |

These metal chlorides form complex ions as described above. Exemplary of such complex ions are $[Ni_2Cl_3]^{+1}$, $[Ni_2Cl_4]^{+2}$, $[Al_3Cl_7]^{+2}$, $[Cu_3Cl_4]^{+2}$, $[Sr_2Cl_3]^{+1}$, $[Cr_2Cl_5]^{+1}$, etc.

Referring to the right side of the process flow chart of FIG. 1, an aqueous solution of metal chloride having a concentration of about 5 to 35% and containing fine particles of a ceramic material having a grain size distribution of about 0.05 microns to several mm, preferably, 0.05 to 20 microns, is separately prepared. The complex ion solution is mixed with this metal chloride solution in a proportion of about 30 to 50% of the total volume. This metal chloride or hydrate may be the same as or different from the metal chloride or hydrate in the complex ion solution. The mixture is thoroughly agitated to provide a composite aqueous solution. This composite aqueous solution is acidic and contains $Cl^-$ ions.

Then an aqueous solution of an alkaline agent, such as caustic soda having a concentration of about 30% is mixed with the composite aqueous solution containing the fine ceramic particles. In this step, of a metal oxide are substantially uniformly deposited on the surface of the fine ceramic particles. The remainder is an aqueous solution of NaCl.

The metal oxide-ceramic composite particles are then allowed to settle, and the supernatant portion of the solution is discarded. Alternatively, water is removed by centrifugal separation to leave the composite particles. Then, water is added to the particles to clean out any occluded aqueous solution of NaCl on the composite particles. Thereafter, the remaining water is removed by evaporation, and the solids dried to provide the metal oxide-ceramic composite particles in which the metal oxide crystals of high purity are deposited on the surface of the fine ceramic particles.

The metal oxide is substantially uniformly deposited on the surface of each of the ceramic particles. The grain size (distribution) of the composite particles is about 0.1 to 25 micron when the original grain size of the fine ceramic particles is about 0.05 to 20 micron. Also, the metal oxide is firmly bonded to the surface of the fine ceramic particles and is not stripped off even by impartation of mechanical friction or impact. Such a strong bond is attained by plating-like ionic bonding of the metal oxide to the surface of the fine ceramic particles.

When the metal oxide-ceramic composite particles are sintered together with another metal, the unit particles comprising the integral combination of the metal oxide and the fine ceramic particles are dispersed substantially uniformly in the sintered product.

Also, when the metal oxide-ceramic composite particles are molten at a high temperature and then cooled to solidify, a solid solution is obtained in which the metal oxide component and the ceramic component are homogeneously mixed. This solid solution can be expected to possess excellent characteristics suitable to form various kinds of functional elements such as insulating elements, semiconductor elements, heat generating elements and heat-sensitive elements.

The FIGURE illustrates the described steps for preparing the composite material of the present invention.

The invention is not limited to the listed compounds and other metal chlorides or hydrates are usable with the present invention. Also, mixtures or composites of the metal oxides, which produce proportional metal oxide deposition, may also be produced. For example, compounds such as Ni.Al.Cr.Ox, Ni.Al. Ox, Ni.Cr.Ox, Ni.Cr.B.Ox, Ba.Ti.Ox, Ba.Ti.Cu.Ox, Cu.Ba.Y.Ox and others may be produced by the same process.

Examples of the multi-component composite compositions which can be used are given below:

1) Fe-series:

| a) Fe.Co.Ox | b) Fe.Co.B.Ox |
|---|---|
| Fe.Ni.Ox | Fe.Ni.B.Ox |
| Fe.Cr.Ox | Fe.Cr.B.Ox |
| Fe.Zr.Ox | Fe.Zr.B.Ox |
| Fe.Cu.Ox | Fe.Cu.B.Ox |
| Fe.Si.Ox | Fe.Si.B.Ox |
| Fe.Ti.Ox | Fe.Ti.B.Ox |
| Fe.Mn.Ox | Fe.Mn.B.Ox |
| Fe.AL.Ox | Fe.AL.B.Ox |
| Fe.Mg.Ox | Fe.Mg.B.Ox |
| Fe.Ba.Ox | Fe.Ba.B.Ox |
| etc. | etc. |

As the source of the element B, $Na_2B_4O_7.10H_2O$ is used.

2) Ni-series:

| a) Ni.Co.Ox | b) Ni.Co.B.Ox |
|---|---|
| Ni.Cr.Ox | Ni.Cr.B.Ox |
| Ni.Zr.Ox | Ni.Zr.B.Ox |
| Ni.Cu.Ox | Ni.Cu.B.Ox |
| Ni.Si.Ox | Ni.Si.B.Ox |
| Ni.Ti.Ox | Ni.Ti.B.Ox |
| Ni.AL.Ox | Ni.AL.B.Ox |
| Ni.Mn.Ox | Ni.Mn.B.Ox |
| Ni.Mg.Ox | Ni.Mg.B.Ox |
| Ni.Ba.Ox | Ni.Ba.B.Ox |
| etc. | etc. |

3) Ba-series:

| | |
|---|---|
| Ba.Cu.Ox | Y.Ba.Ca.Ox |
| Ba.La.Ox | Y.Ba.La.Ox |
| Ba.Ti.Ox | Y.Ba.Ti.Ox |
| Ba.Zr.Ox | Y.Ba.Zr.Ox |
| Ba.AL.Ox | Y.Ba.AL.Ox |
| etc. | etc. |

4) Other examples:

Y.Ba.Ti.Cu.Ox
Y.Ba.Ti.Zn.Ox
Y.Ba.Zr.Cu.Ox
Y.Ba.Zr.Pb.Ox
Fe.Ni.Mn.Ox
Fe.Co.Mn.Ox
Fe.Sn.Ox
Fe.Se.Ox
Fe.Se.Ag
Fe.Co.Se.Ag.Ox
etc.

Each of the elements in the composite powders comes from an aqueous solution of each of the corresponding chlorides, such as $FeCl_3.6H_2O$, $NiCl_2.6H_2O$, $CrCl_2.6H_2O$, $CuCl_2.2H_2O$, $BaCl.2H_2O$.

Up to 20 or more metal chloride or hydrate, or combinations thereof, can be combined to form composite powders with unique properties. Thus, particles having a uniform distribution of various metals in proportion to their presence in solution can be produced according to the present invention. For example, if 50% by wt. nickel, 30% aluminum and 20% chromium are present, the film coating will contain the same proportion of metal oxides. Another combination would be 60% Ni, 30% Al and 10% Cr, which has been found to act as a positive temperature coefficient (PTC) resistor. This custom processing provides metal ceramic composite materials with unique properties, which have application in many industries, not only in the semiconductor field.

It will be understood from the foregoing description that the ferrite-ceramic composite powder according to the present invention can be effectively used as a material for manufacturing a variety of secondary industrial products and can be expected to exhibit excellent characteristics over the prior art especially when used as a material for manufacturing insulating elements, semiconductor elements, etc.

I claim:

1. A metal oxide-ceramic composite powder comprising:
   fine particles of a ceramic material, said fine ceramic particles each having a precipitated metal oxide crystalline film integrally and ionically bonded thereto in a reduction reaction of a complex ion solution, the film coating the entire particle surface 2. A metal oxide ceramic composite powder according to claim 1 wherein said fine particles of ceramic material are selected from the group consisting essentially of zircon, zirconia, silicon dioxide, alumina, cobalt oxide, titanium oxide, barium oxide and boron oxide, an oxide, a nitride or a carbide of a metallic or semi-metallic element.

3. A metal oxide ceramic composite powder according to claim 1 wherein said complex ion is composed of a metallic element.

4. A metal oxide ceramic composite powder according to claim 1 wherein said complex ion is composed of a metallic element and a semi-metallic element.

5. A metal oxide ceramic composite power according to claim 1 wherein said complex ion is composed of a proportional blend of metallic ions.

6. A metal oxide ceramic composite powder according to claim 1 wherein said fine ceramic particles have an average particle size of from about 0.05 to about 20 microns.

7. A metal oxide ceramic composite powder according to claim 1 wherein said crystalline film bonded to the ceramic particles is the reaction product of complex ions, selected from the group consisting of metals and semi-metals, and an alkaline agent.

8. A metal oxide ceramic composite powder according to claim 1 wherein the particle size of the metal oxide ceramic composite powder is in the range of from about 0.05 to about 25 microns.

9. A method as in claim 8 wherein the ferrite particles of the particles without the crystalline film are in the range from about 0.05 to about 20 microns.

10. A metal oxide ceramic composite powder according to claim 2 wherein said semi-metallic element is selected from the group consisting essentially of cobalt, barium or titanium.

11. A metal oxide ceramic composite powder according to claim 1 wherein the particle size of said metal oxide ceramic composite powder is in the range from about 0.1 to about 25 microns.

* * * * *